(12) United States Patent
Rupp et al.

(10) Patent No.: US 8,131,637 B1
(45) Date of Patent: Mar. 6, 2012

(54) PREDICTIVE MODEL FOR USE IN PROVIDING AN EQUITY RELEASE FINANCIAL PRODUCT

(75) Inventors: David H. Rupp, Charlotte, NC (US); Colin D. McCormick, Charlotte, NC (US); Cherie A. Arruda, Arlington, MA (US); Lisa D. Curry, Warwick, RI (US); Michael Teichman, Medfield, MA (US)

(73) Assignee: Bank of America Corporation, Charlotte, NC (US)

( * ) Notice: Subject to any disclaimer, the term of this patent is extended or adjusted under 35 U.S.C. 154(b) by 744 days.

(21) Appl. No.: 11/560,089

(22) Filed: Nov. 15, 2006

Related U.S. Application Data

(60) Provisional application No. 60/803,527, filed on May 31, 2006.

(51) Int. Cl.
*G06Q 40/00* (2006.01)

(52) U.S. Cl. .................................. 705/38; 35/36; 35/37

(58) Field of Classification Search ................ 705/1–88; 235/379; 902/8; 715/1–89; 340/1–16
See application file for complete search history.

(56) References Cited

U.S. PATENT DOCUMENTS

| | | | |
|---|---|---|---|
| 5,673,402 A | 9/1997 | Ryan et al. | |
| 5,991,745 A | 11/1999 | Kiritz | |
| 6,012,047 A | 1/2000 | Mazonas et al. | |
| 2002/0116321 A1* | 8/2002 | Arehart | 705/38 |
| 2003/0115128 A1* | 6/2003 | Lange et al. | 705/37 |
| 2003/0154161 A1 | 8/2003 | Stahl et al. | |
| 2004/0220872 A1* | 11/2004 | Pollock, III | 705/38 |
| 2004/0220874 A1 | 11/2004 | Singh et al. | |
| 2005/0108123 A1* | 5/2005 | Schneider | 705/35 |
| 2007/0078744 A1* | 4/2007 | Koss et al. | 705/36 R |

OTHER PUBLICATIONS

Australian Securities & Investments Commision staffs, Equity relase products, Nov. 2005, online edition, pp. 1-51.*

* cited by examiner

*Primary Examiner* — Marissa Liu
(74) *Attorney, Agent, or Firm* — Michael A. Springs; Moore & Van Allen PLLC; James C. Edwards

(57) ABSTRACT

A predictive model for use in providing an equity release (reverse mortgage) financial product is disclosed. In at least some embodiments, a plurality of representative loans are created, wherein each loan can be characterized by a borrower type and a mortality table. A plurality of joint interest rate and house price scenarios are also created. Each of the representative loans can be run through each of the joint interest rate and house price scenarios to measure profitability metrics. The model can also be used to determine loan-to-value (LTV) ratios based on considerations including borrower age, loan volume sensitivity, a determined profit-maximizing LTV ratio, and geographic market considerations.

10 Claims, 6 Drawing Sheets

PREDICTIVE MODEL FOR USE IN PROVIDING AN EQUITY RELEASE FINANCIAL PRODUCT

CROSS-REFERENCE TO RELATED APPLICATION

This application claims priority from co-pending, commonly-owned provisional patent application Ser. No. 60/803,527, filed May 31, 2006, the entire disclosure of which is incorporated herein by reference. Much of what is disclosed herein is also disclosed in commonly owned applications Ser. No. 11/560,096, entitled, "Convertible Home-Equity Based Financial Product" and Ser. No. 11/560,122, entitled, "Method and Apparatus for Providing a Home-Equity Based Line of Credit," both of which have been filed on even date herewith and both of which are incorporated herein by reference.

BACKGROUND

A mortgage is a traditional financial product that allows a person or persons to finance or re-finance the purchase of a home. At least two other traditional financial products allow a home owner to obtain funds by mortgaging the value of his or her existing home, or at least the equity in the home. A home equity loan can be obtained from a financial institution by the home owner, who may be referred to by the financial institution as a "customer" or "borrower." The customer takes out the loan and a lien is placed on the home by the financial institution so that the loan is secured by the equity in the home. As with a mortgage, the borrower makes payments with interest to the financial institution for the life of the loan. The loan may be taken out as a lump sum, or may be set up as a line of credit, where the borrower draws on the line as money is needed. In the case of the line of credit, monthly payments are adjusted accordingly for the outstanding balance at any given time. The amount of the loan, or the size of the line of credit is calculated as a percentage of the value of the equity in the borrower's home, and this percentage is commonly referred to as the loan-to-value (LTV) ratio or percentage, or simply as the "LTV."

Another vehicle, the reverse mortgage (RM), allows a borrower to draw upon the equity in his or her home without having to make any payments until the loan is terminated. A reverse mortgage product offered by a financial institution is sometimes referred to as an "equity release product" and such a loan is sometimes referred to as an "equity release loan." Typically, a reverse mortgage is set up as a line of credit which is again calculated as a percentage of the value of the borrower's home, the LTV.

A reverse mortgage can be terminated by the death of all borrowers, sale of the home, non-residence of all borrowers for a period of 12 months, violation of home upkeep standards, or failure to pay insurance or taxes. Although with some equity release products borrowers may choose to make partial or full repayments of a reverse mortgage loan, in the typical case, no payments are made, and the lending institution obtains the minimum of the net sale proceeds of the property and the loan balance as "repayment" of the loan upon the death of the last of the borrowers, since reverse mortgages are typically non-recourse loans. Thus, underwriting criteria are based primarily on the property itself and not on the credit worthiness of the borrower(s). However, a minimum age requirement for the borrowers is typically imposed. Examples of specific, known reverse mortgage products include the Home Equity Conversion Mortgage (HECM) product insured by the United States Federal Housing Administration (FHA), and Fannie Mae's Home Keeper.

SUMMARY

Example embodiments of the present invention provide modeling techniques that can be used to evaluate an equity release product, sometimes referred to as a reverse mortgage. Such an evaluation can be used to determine profitability metrics, as well as loan characteristics such as loan-to-value (LTV) ratios for loans to be made as part of the product.

In at least some embodiments, a plurality of representative loans are created, wherein each loan characterized by a borrower type and a mortality table. A plurality of joint interest rate and house price scenarios are also created. In example embodiments, these loans and scenarios can be virtual in nature. That is, their characteristics are defined so that a product or proposed product can be evaluated. Each of at least some of the representative loans can be run through each of at least some of the joint interest rate and house price scenarios to measure profitability metrics. The profitability metrics across the plurality of scenarios can then be aggregated to produce aggregated profitability metrics for the equity release product.

In example embodiments, the process of running representative loans through the various scenarios can include determining home prices, using a utilization function for a representative loan to determine a draw amount, determining a rate of termination for a representative loan, and calculating a distribution for a representative loan. In addition to determining profitability metrics, a model according to example embodiments of the invention can be used to determine LTV ratios. These ratios can be based on considerations including borrower age, loan volume sensitivity, a determined profit-maximizing LTV ratio, and geographic market considerations.

The modeling according to example embodiments of the invention can be facilitated by means of an instruction execution platform such as a computer system executing an appropriate computer program product or computer program code instructions. In some embodiments, the information defining the various loans and scenarios, as well as mortality tables, borrower characteristics, and the like, can be stored in tables and/or databases and then read by software as the model is executing.

DETAILED DESCRIPTION OF THE INVENTION

Figure 1:
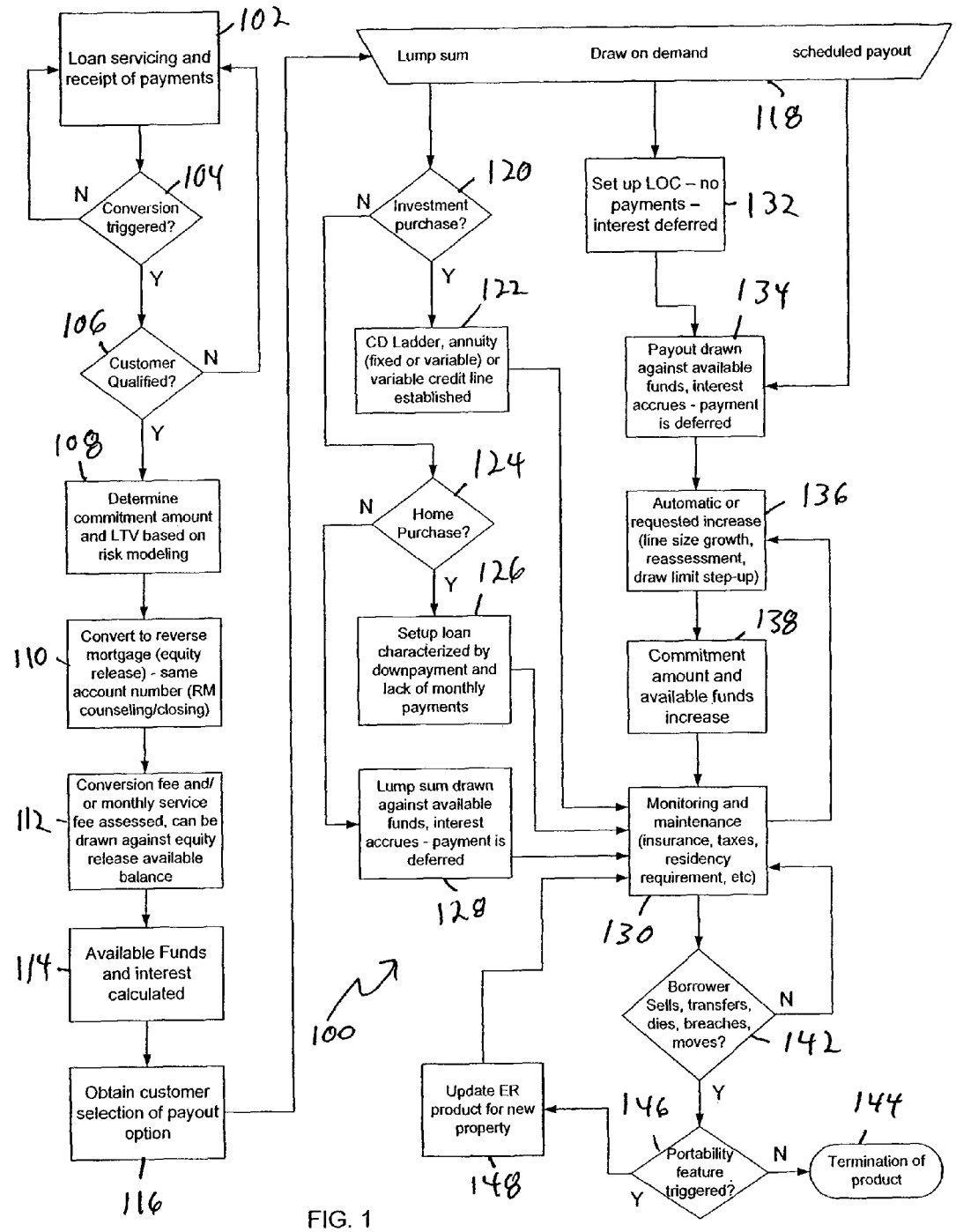
FIGS. 1-5 are flowcharts that illustrate methods according to example embodiments of the present invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of a hardware embodiment, a software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions, or may be human-performed unless otherwise stated. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The term "bank" and any similar terms are used herein in their broadest sense. Financial institutions that process transactions and documents of the types discussed can include stock brokerages, credit unions, and other types of institutions which are not strictly banks in the historical sense. The use of terms such as bank, "financial institution", "lender", or the like herein is meant to encompass all such possibilities. Also, the use of the term "home loan" is intended to encompass any and all traditional loans secured by the residence of the borrower including traditional mortgages, home equity loans, so-called "bridge" loans and home equity lines of credit.

FIG. 1 is a flowchart illustrating an example of an overall process, 100, in which example embodiments of the invention might be used. Like most flowcharts, the flowchart of FIG. 1 illustrates process 100 as a series of process blocks. In the example of FIG. 1, a customer has an existing relationship with a financial institution based on a traditional home loan, in this example, a home equity line-of-credit (HELOC), which is being serviced as shown at block 102. It can be presumed for purposes of this example that the HELOC was set up in response to an application for such a loan, and that at the time of the application, a typical credit review was conducted. Finally, the HELOC in this example was closed with the normal paperwork, except that the product was set up with the customer so that the HELOC could be converted to an equity release loan upon the customer's request. As previously mentioned, it would be possible to have other events trigger the conversion, for example, the customer reaching a specific age.

During the time when the HELOC shown in FIG. 1 is being administered at block 102 the customer makes payments, including interest. A home loan product according to example embodiments of the invention can be set up so that the product allows borrowers to convert their HELOC to the equity release product with ease. The home loan product can be structured such that borrowers will normally meet the general conversion requirements mentioned below for minimum home equity and combined LTV. To stay with the current example, the HELOC can also be designed so that borrowers can "fast-track" through the reverse mortgage application process if and when a borrower decides to convert the HELOC to a reverse mortgage.

When conversion is triggered at block 104 of FIG. 1, a determination is made by the financial institution at block 106 as to whether the customer meets the qualifications that are placed on the product. In example embodiments, the lender may require borrowers to be at least 62 years old, and have a minimum contractually-defined percentage of equity in their home. The combined loan-to-value ratio (CLTV) for all the home products that the borrower has at the financial institution might be required to be below a pre-specified threshold. If the customer is not qualified for some reason, the HELOC continues at block 102, otherwise the LTV, and any initial commitment amount, if different, are determined at block 108.

It should be noted that with any reverse mortgage, whether or not it has been granted as a converted product as described above, there is a possibility that the balance may rise above the value of the home. At termination, the lender may only be able to claim an amount up to the value of the home at sale since the loan is typically non-recourse. If the value of the home at sale exceeds the loan balances in such a case, the borrower or his/her heirs keep the excess proceeds from the sale. If the loan balances exceed the value of the home at sale, the lender is forced to take a loss, which is the shortfall between the loan balances and the sale proceeds. One way to mitigate the riskiness of a reverse mortgage product is to obtain insurance to protect both the lender and borrower, and such insurance can be provided as a component of a convertible product like that disclosed herein. Alternatively, a financial institution can simply try to predict the likelihood of a loss for a given proposed loan based on past experience.

However, according to embodiments of the invention a predictive model can be used to quantify risks. In example embodiments, such a model projects the product's cash flows along a series of simulated house prices, interest rates and termination dates.

The model used at block 108 of FIG. 1 can be calibrated against a combination of historical price movements and market-based instruments. In addition to stochastic elements, the model can contain detailed expense assumptions that reflect the costs incurred by the lender to originate service and terminate the loan. The model can also project cash flows and its outputs can be used to determine overall product profitability in a manner consistent with the lender's profitability measures. A more detailed example of the model is described in greater detail below with reference to FIGS. 2 and 3.

In the example process of FIG. 1, at conversion, borrowers can be offered a choice for the interest rate structure of the equity release loan. The loan can be structured so that borrowers are able to switch between rate structures, possibly subject to switching fees and frequency restrictions specified at origination. For example, rate structure options that can be offered include a variable rate structure, where loan balances (withdrawals and financed fees) accrue interest at an adjustable rate and rate caps on annual and lifetime rate increases can be specified at origination. Alternatively, loan balances can accrue at a fixed rate that is specified at the time of conversion. A hybrid arrangement could also be offered, for example, one where a fixed rate of interest is used for a period of time, after which balances will accrue interest at a variable rate.

The borrower's initial principal limit (the size of their line of credit at conversion) can be calculated as a percentage of the home value. In cases where the borrower has chosen some form of equity protection, the portion of the home value upon which the principal limit is based can be reduced accordingly. The repayment amount at termination will typically be the fair market value of home. If the equity release is provided as a line of credit, the allowed credit line can be calculated as a percentage of the home value that is based on the age of all borrowers, interest rate assumptions, the maximum loan amount allowed by the lender's policies, and any other appropriate factors determined by the lender.

Still referring to FIG. 1, the home equity loan is converted to a reverse mortgage, or "equity release" loan at block 110. This conversion process can include documentation and reverse mortgage (RM) counseling. The product can be set up so that there is a low or no-documentation upon conversion characteristic, which would allow less information to be detailed to the borrower, and may allow the same account number to be maintained. At block 112 the conversion fees are determined and assessed, and can be drawn on the available balance. At block 114 the available funds and initial interest are calculated. These two blocks are often executed at the same time and could easily be reversed. At conversion, the borrower's existing loan balances would be transferred to the equity release product and the borrower would stop making monthly payments.

In the example process of FIG. 1, a required payment draw feature can be included to allow the credit line to be used by the lender for payment of taxes, insurance, and upkeep costs or other fees and services related to the underlying property. This feature can be designed to mitigate the risk to the lender of borrowers not complying with their contractual obligations on property upkeep and tax and insurance payments. Subject to any legal requirements, the payment draw feature can be presented to borrowers as either a necessity or an option. Pricing, procedures, rights, and obligations of all parties can be established and agreed at origination.

Equity protection can also be provided as part of the equity release described above. In example embodiments, an equity protection feature can provide borrowers with the option of setting aside a portion of the equity in their home to be protected against the bank lien. This portion of the equity would be unavailable for use as collateral. At termination, the lender could only claim an amount up to the value of the home at sale minus the protected equity that is in effect.

With an example equity protection feature, at origination of the product, borrowers can be required to select an equity protection option from a menu of options. If the borrower selects no equity protection, he or she will be offered a credit line that the lender calculates based on the full amount of the home value. If the borrower elects to protect some of the home value from the bank lien, the borrower can be offered a credit line that the lender calculates based on the home value minus an agreed percentage, or an agreed fixed dollar amount. The subtraction of a fixed dollar amount will be applied whenever the credit line is re-assessed during the life of the loan. To simplify this option, an allowed range of values can be specified by the lender. With an option to select a percentage of the home value to be protected from the bank lien, an allowed range of percentages can be specified by the lender. If the borrower selects this option, he or she will be offered a credit line that the lender calculates based on the home value minus the agreed percentage of the home value. The subtraction of the percentage can also be applied whenever the credit line is re-assessed during the life of the loan.

Still referring to FIG. 1, at block 116, a customer selection of how the funds are to be distributed is obtained, and processing then branches at block 118 depending on that selection. Borrowers, at origination, can be offered a number of choices for how they choose to withdraw money against the loan. The lender can specify any restrictions on the ability of the borrower to switch the withdrawal method during the life of the loan. Withdrawal method options available to borrowers in this example include a lump sum option. With this option, at origination, the borrower takes a lump sum withdrawal of the entire available loan amount. A determination can be made at block 120 whether to provide an investment using these funds at block 122. This investment can be a CD ladder, a fixed annuity, or a variable annuity. Note that these are examples only. Other types of investments, such as a long term care insurance policy, could be provided for the customer.

In the example process of FIG. 1, a borrower may also choose at block 124 to use the lump sum proceeds to purchase a home, such as a second home or vacation home. If the borrower chooses this option, the loan is setup to provide the downpayment and no monthly payments are required as shown at block 126. In this example, the lender, at block 126, can specify a distinct set of mortgage terms for borrowers who commit to use the loan for a home purchase. The salient features of the loan which differ from the standard reverse mortgage product in such an example might include a residency requirement and that the initial balance on the loan will be equal to the purchase price of the home minus the down payment. Interest can be made to accrue on the balance of the loan until a termination event occurs, and the loan can be set up to be a non-recourse loan. In such a case, the most the bank can ever recover is the value of the home. At termination, the loan is due and payable. If the home is sold, any proceeds above the amount of the loan go the borrower or the borrower's estate.

At block 128 of FIG. 1, if the borrower does not choose to set up an annuity or purchase a home, the lump sum is paid out, interest accrues, and payment is deferred. For all lump sum options, monitoring and maintenance of the equity release loan commences as shown at block 130.

Returning to block 118 of FIG. 1, the borrower can choose to establish a line of credit at block 132 and can withdraw money at any time and in any amount up to the maximum line amount, or the borrower can choose to receive scheduled payments over time. In either case, the payout is drawn against available funds, interest accrues, and payment is deferred as shown at block 134. In this example, a borrower could also choose a combination of one of the lump sum options and one of the payment-over-time options.

Still referring to FIG. 1, blocks 130, 136, 138, and 142 are, in a typical example, executed continuously and concurrently, as indicated by the feedback arrows shown. At block 136, the loan with payouts over time can be adjusted either periodically or upon borrower request or other trigger event. This adjustment can be made via re-assessment, or a draw limit step-up feature, both of which will be discussed in detail later with respect to FIGS. 4 and 5. Line size growth can also be accomplished by periodically bringing the line of credit or scheduled payments into alignment with the loan the borrower would be approved for if the borrower were to originate the loan at the time the line size is reset. Line size growth can be implemented using periodic (for example, annual) resets based on the lender's prevailing interest rates and borrower age-related actuarial calculations. The product can be set up so that the lender will never decrease line size. When any of these adjustments are made, the commitment amount and available funds are increased accordingly at block 138 and monitoring and maintenance continues at block 130.

At block 142 of FIG. 1, a determination is made as to whether a condition of terminating the loan has occurred. If so, the loan would usually be terminated at block 144. If not, as shown by the feedback arrow, monitoring and adjustment continues. In example embodiments, a product can have a number of associated termination triggers, which define the conditions under which the loan becomes due and payable. Termination triggers can include, for example, the death of all borrowers on the contract, the sale of the home, the non-residence of all borrowers for more than 12 months, non-compliance with contract conditions, and any other property change that affects title. Borrowers can be contractually required to comply with a number of home upkeep and insurance payment requirements in order to remain in good standing on their loans, or face termination. Violation of any of the maintenance requirements can give the lender the right to initiate resolution (cure) or loan termination procedures against the borrower as detailed in the loan contract. If a borrower is found to be in breach of maintenance requirements, the lender's principal goal may be to specify conditions and deadlines that the borrower can meet or actions that the lender can take on behalf of the borrower in order to come back into compliance and thus prevent termination. A product can be set up, however, so that the lender has the right to initiate loan termination procedures in cases specified in the loan contract, subject to any applicable laws.

Blocks 146 and 148 of FIG. 1 are intended to describe a portability option that can be included with an embodiment of the present invention. When a termination condition occurs that is connected with non-residency, a move, or the like, a determination is made at block 146 as to whether the portability feature can be used to transfer the equity release loan to another home. If so, the equity release line of credit, annuity, or other product is updated for the new property at block 148, and maintenance continues at block 130 as before. Portability can allow the borrower to transfer the loan to a new property in the event that the borrower decides to move to another home. This feature reduces the documentation requirements and the need to re-apply for the loan if the new property meets certain requirements that can be specified by the lender. Otherwise, such an event again results in termination at block 144 as previously described.

Figure 2:
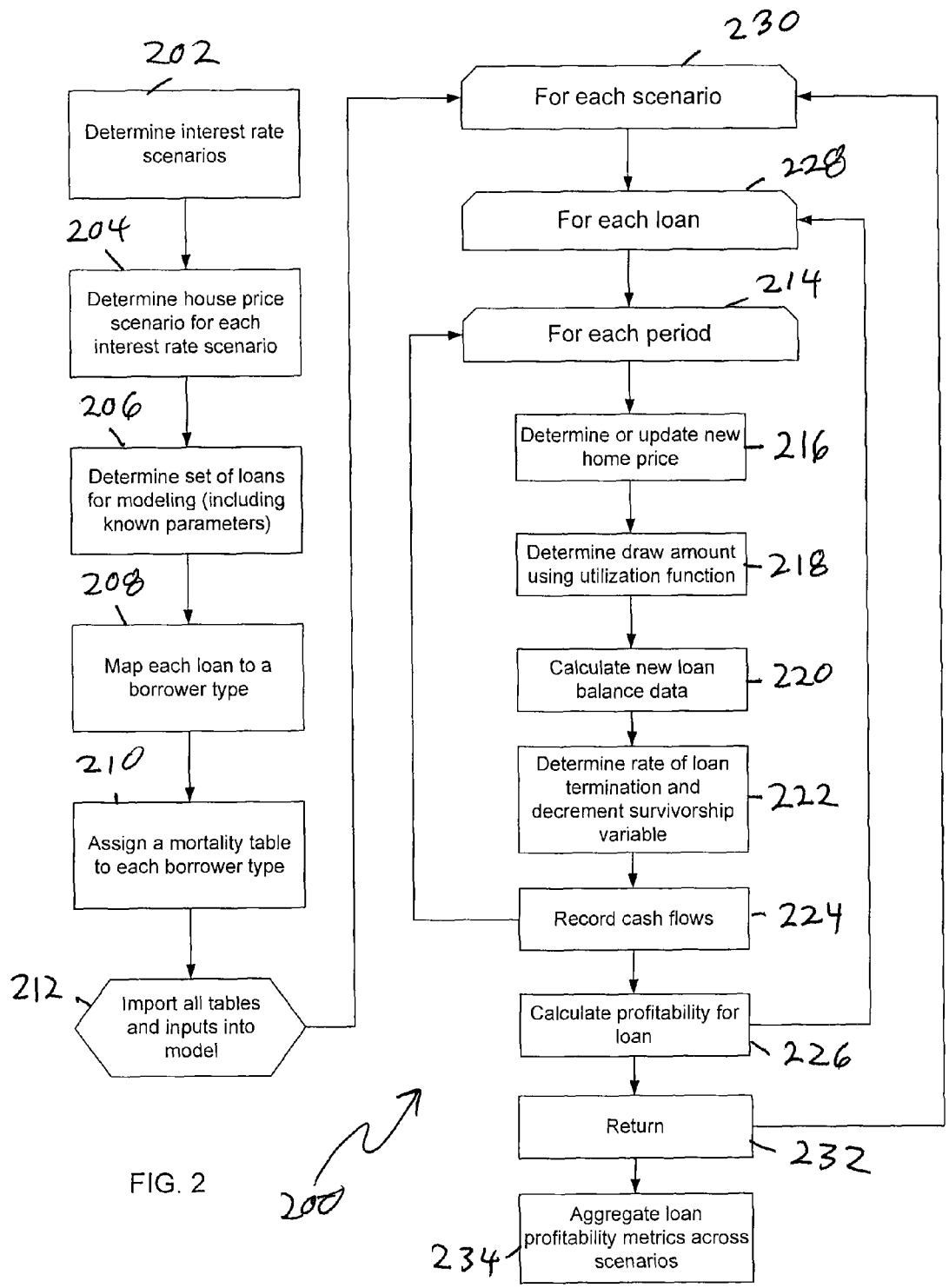
Figure 3:
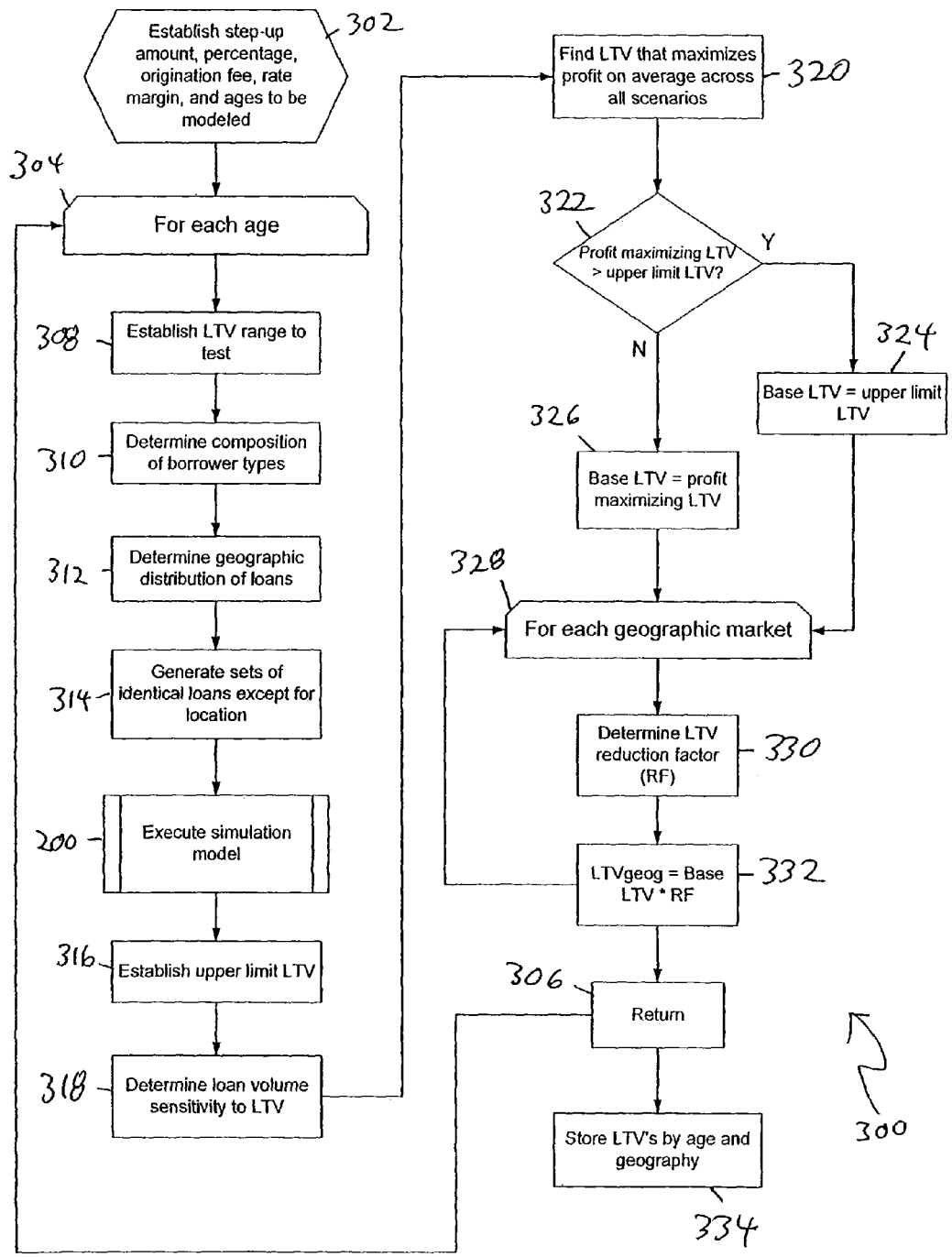

FIG. 2 is a flowchart illustration of the operation of a simulation model according to example embodiments of the present invention, and FIG. 3 is a flowchart illustration of how to use such a model to determine the LTV in example embodiments of the present invention. The example model projects cashflows and profitability measures based on a set of representative loans that serve as the sample "borrowers" for the model. For each loan, the user specifies a variety of parameters, including borrower age and gender, house values, house location, utilization parameters (borrower's withdrawal frequency and amount) and loan options such as line increase method and equity protection. Note that the model described with reference to FIG. 2 can be used with any equity release loan regardless of how it is originated. It can be used with loans that are not the result of the conversion process discussed above.

The example model runs each loan through a large number of joint interest rate/house price scenarios. As time passes, cashflows and loan parameters are survivorship-adjusted. That is, if a termination rate of 2% is expected in a given year, the cash flow quantities are scaled-down to reflect the reduction in surviving loans; termination-driven cashflows are linked to the rate of terminations. The example model then outputs all cashflows and operates on them to produce various profitability measures across the full distribution of scenarios.

To project realistic, best-estimate cashflows, the example model must be calibrated by a variety of market and borrower-related inputs. Interest rate assumptions are required to determine a baseline for the rate charged on loan balances along each projected path. House price scenarios are needed to determine the evolution of collateral value, which impacts the amount recovered from the loan. Costs are needed to reflect expenses incurred by the lender during loan origination, servicing and closing. In addition, the example model uses various input tables, which generally specify termination rates across ages. A description of each of these inputs follows:

Interest rates: The example model imports a set of risk-neutral interest rate scenarios that project treasury curves. Scenarios are generated by a 1-factor Hull-White model, calibrated to the market prices of a collection of interest rate derivatives and swaptions. The data is read into the model from CSV files, each of which contains a vector of rates across time for every scenario. For example, a CSV file may contain a projection of the 1-month rate over 30 years, recorded monthly, for each of 1000 scenarios. For the example model, a 1-month LIBOR rate upon which the loan rate is based can be used. An alternative model might use the 3-month treasury rate plus a spread for a prime rate upon which the loan rate is based.

House price appreciation (HPA): In example embodiments MSA-level HPA scenarios are generated using a lognormal model with serial correlation and mean reversion. The house price appreciation from time (t−1) to time t is given by:

$$\log(HPA_t^{MSA}) = \mu_t + \rho_t \log(HPA_{t-1}^{MSA}) + \alpha(\tau - \log HP_{t-1}^{MSA}) + \sigma_t \epsilon_t, \text{ where}$$

$\mu$=mean log appreciation
$\rho$=serial correlation coefficient
$\alpha$=strength of mean reversion
$\tau$=target log house price
$\sigma_t$=volatility
$\epsilon_t$=noise term Parameters for the MSA-level HPA model in this example are calibrated using a combination of forecasts and statistical analysis of historical data. The model will weight forecasts more heavily when calibrating parameters for earlier time periods (i.e. the immediate future) and transition toward using estimates based on historical regressions when calibrating long-run parameter values. Scenarios for appreciation of an individual house price x will cascade from the MSA-level scenarios, as shown by:

$$HPA_t^x = HPA_t^{MSA} - D_t + \sigma_t^x \epsilon_t', \text{ where}$$

$D_t$=depreciation
$\sigma_t^x$=specific volatility of the house within the MSA
$\epsilon_t'$=noise term Utilization: For example embodiments, a set of utilization functions that describe typical borrower draw patterns observed in comparable home equity products is used. In this embodiment, the primary archetypes of draw patterns are a lump sum pattern, a monthly disbursement draw pattern, and a combination draw pattern. A lump sum pattern is one where the borrower withdraws entire line up front. In a monthly disbursement draw pattern the borrower withdraws a fixed amount per month. A combination draw pattern is one in which the borrower withdraws a portion of the line up front and then fixed amounts on a monthly basis. Adjustments to the behavior specified in each archetype can be applied to select borrowers to reflect borrower propensity to behave differently under specific home value and interest rate conditions.

Mortality: Actuarial mortality tables indicate the probability that a person dies in the current year given his/her age. For the example model, in addition to segmenting the tables by gender, several types of tables corresponding to different types of borrowers can be used. For example, a population table gives mortality for the general population, a pension/annuity table is built on the assumption that borrowers live longer than the general population, partially because of their desire to take a longevity bet, and a disability/morbidity table is directed to characterizing the mortality of borrowers less healthy than the general population. For the example model, the mortality tables are applied at different weights across the utilization archetypes to reflect the different mortality expectations for borrowers who exhibit different draw patterns. For example, a borrower who withdraws a lump sum in order to purchase an annuity would be best described by the low-mortality pension/annuity table because of the long-term horizon of product usage.

Non-mortality terminations: Non-mortality based terminations can be classified as either voluntary, where the termination follows from home sale or move-out, and involuntary, where the termination results from death or contract breach. The example model imports tables containing estimates of borrower's voluntary termination rates by loan year calibrated to data for comparable products. In addition, the model imports tables containing estimates of involuntary termination rates calibrated against morbidity studies by the Society of Actuaries, as well as data for comparable products.

Costs: Example embodiments of the model estimates of origination and servicing expenses drawn from assumptions based on experience. Additionally, the model of this embodiment estimates property disposition costs based on estimates of costs derived from analysis of actual experience in the first mortgage and HELOC businesses.

Turning to FIG. 2, the various tables and inputs are set up as described above for process 200 beginning at block 202, where interest rate scenarios are determined. At block 204, a house price scenario is determined for each interest rate scenario. At block 206, a set of loans and their known parameters are selected for modeling. Each loan is mapped to a borrower type at block 208, and an appropriate mortality table is assigned for each borrower type as described above at block 210. Finally, at block 212 all tables and inputs are imported into the model algorithm to set up the model for execution. The remaining process blocks in FIG. 2 describe what is done for each period in each loan in every scenario as nested "for-loops" as is known in the art.

Still referring to FIG. 2, for each period of each loan of each scenario, within the loop limit beginning with block 214, house price is determined or updated based on current scenarios at block 216. Background parameters such as time variables are incremented appropriately. A draw amount for the current period is determined by the utilization function at block 218. Loan balance data, including loan balance, available-to-draw amount and fees/expenses is updated at block 220. The available-to-draw amount is affected not only by the withdrawal amount, but also by the specified line increase method (including increases due to house price reassessment). At block 222, the rates of mortality and other (voluntary and involuntary) terminations are derived from the input tables and adjusted for model frequency. The rates are also adjusted for concurrency, since only one termination event can occur at a time; the total rate of termination is not simply the sum of each individual rate. A variable indicating the level of survivorship is then decremented by the adjusted termination rates. Finally, at block 224, cashflows specific to termination events are recorded on a survivorship-adjusted basis, and processing returns to loop limit 214. Loan parameters are recorded both with and without survivorship adjustments; the former is used to generate output on the same basis as the cashflows, while the latter enables ongoing calculations on the same basis as house prices and the utilization function.

Staying with FIG. 2, once all the above calculations have been carried out for all the periods in a loan, the profitability for each loan is calculated at block 226 within the loop limit shown at block 228. Loop limit block 230 denotes the loan and period processing being done for each scenario, returning each time from return block 232. Finally, scenario profitability metrics are aggregated across all scenarios at block 234 to produce the various outputs of the model. In this example these outputs are: shareholder value added, which is the mean net present value of economic profit, where economic profit is defined as accounting net income less a cost-of-economic capital that reflects shareholder performance expectations; return on assets, which is the mean return on funds disbursed over the life of the loan; risk-adjusted return on capital, which is the mean return on economic capital over the life of the loan; and economic embedded value, which is the present value of loan cashflows discounted on a risk-free basis.

The model of the example embodiments outputs each of the aggregated profitability metrics outlined above as a portfolio aggregation and a loan level value. The former is the value of a portfolio of loans along each scenario, and the latter is the average value of an individual loan across a full set of scenarios. Together, these outputs permit analysis both of full portfolio profitability across individual economic scenarios as well as of the average profitability of individual loans. In addition, the net present value profitability measures can be decomposed to reflect the profit or loss created during loan servicing, home sale and other activities. The model algorithm can also be implemented to provide the option to produce detailed cashflow output, which lists all cashflows and loan parameters across time for selected scenarios.

Market risk capital depends on interest rates and HPA. For interest rates, one can compute the difference between time 0 net present value (NPV) and the lesser of discounted time 1 NPV under shock-up and shock-down scenarios. For HPA, one can compute the difference between time 0 NPV and discounted time 1 NPV under shock down house price. Business risk capital depends on expenses, loan persistency (uncertainty), termination types, refinance risk, and utilization. As an example, for expenses, one can assume 50% of the expected NPV of servicing costs. For loan persistency, one can assume 80% and 125% of the baseline (expected) non-mortality termination rates. Termination type can be more heavily weighted towards the least profitable type of termination. The refinance risk can be accounted for by increasing the non-mortality termination rate to 500% of the best estimate in the upcoming 12 months followed by a return to the best estimate. For utilization, one can simply re-weight utilization types more heavily towards the least profitable. For operational risk, a typical financial institution's operational risk 014033-000150 framework can be used. Life risk capital can be evaluated based on mortality level and mortality trend, both of which represent uncertainty. For mortality level, one can multiply best estimate mortality rates by 80%, and for mortality trend, one can increase baseline improvement by 25%.

FIG. 3 illustrates an example process for using a model like that described above in determining an LTV ratio to use in granting an equity release loan. Process 300 of FIG. 3 begins when various parameters are set up for the algorithm to run. Note that the setup of FIG. 3 is independent of the setup described with respect to the model itself as shown in FIG. 2. At block 302 of FIG. 3, the step-up amount, percentage, origination fee, rate margin, and ages to be modeled for setting the LTV are established. Most of the rest of process 300 is included in the for loop defined by loop limit block 304 in which the blocks of the loop are executed for each age to be modeled. Processing for this loop returns from block 306. At block 308, an LTV range to test is established for the age in the current run of the loop. At block 310 a composition of borrower types to be tested is determined. The geographic distribution of the loans to be evaluated is determined at block 312. At block 314, sets of identical loans are generated, that is, identical except for geographic location of the residences. Simulation model 200 is then executed for the age that is currently being looped through. The simulation model of FIG. 2 is executed for each age being modeled to set the LTV ratio as shown in FIG. 3. The execution of the simulation model allows the establishment of value for the LTV ratio as shown at block 316. In this example embodiment, this value is used as an upper limit that is taken into account in the remaining calculations. Volume sensitivity to LTV ratio is estimated at block 318 and at block 320, the LTV that maximizes profit on average across all scenarios as determined with the aid of the simulation model is established.

Still referring to FIG. 3, once the profit maximizing LTV ratio and the upper limit on the LTV ratio are determined, the two LTV ratios are compared at block 322. If the profit maximizing LTV ratio is greater than the upper limit ratio, the base LTV ratio is set to be the same as the upper limit LTV ratio at block 324. Otherwise, the base LTV ratio is set to be the same as the profit maximizing ratio at block 326. Optionally, another for loop is nested within the "for each age" loop previously discussed. For each geographic market as shown at loop limit 328, a reduction factor is determined at block 330. This reduction factor is designed to account for home values that are lower than average in a particular geography. A geographic LTV ratio, $LTV_{geog}$, is set by multiplying the base LTV by the reduction factor at block 332. The above described process including the for loop to adjust LTV ratios by geography, is executed for each age to be modeled. Once all ages have been run, loan-to-value ratios for each age, for each geography, are stored for use in offering reverse mortgage loans. These loans can either be original loans, or converted loans as previously described.

Figure 4:
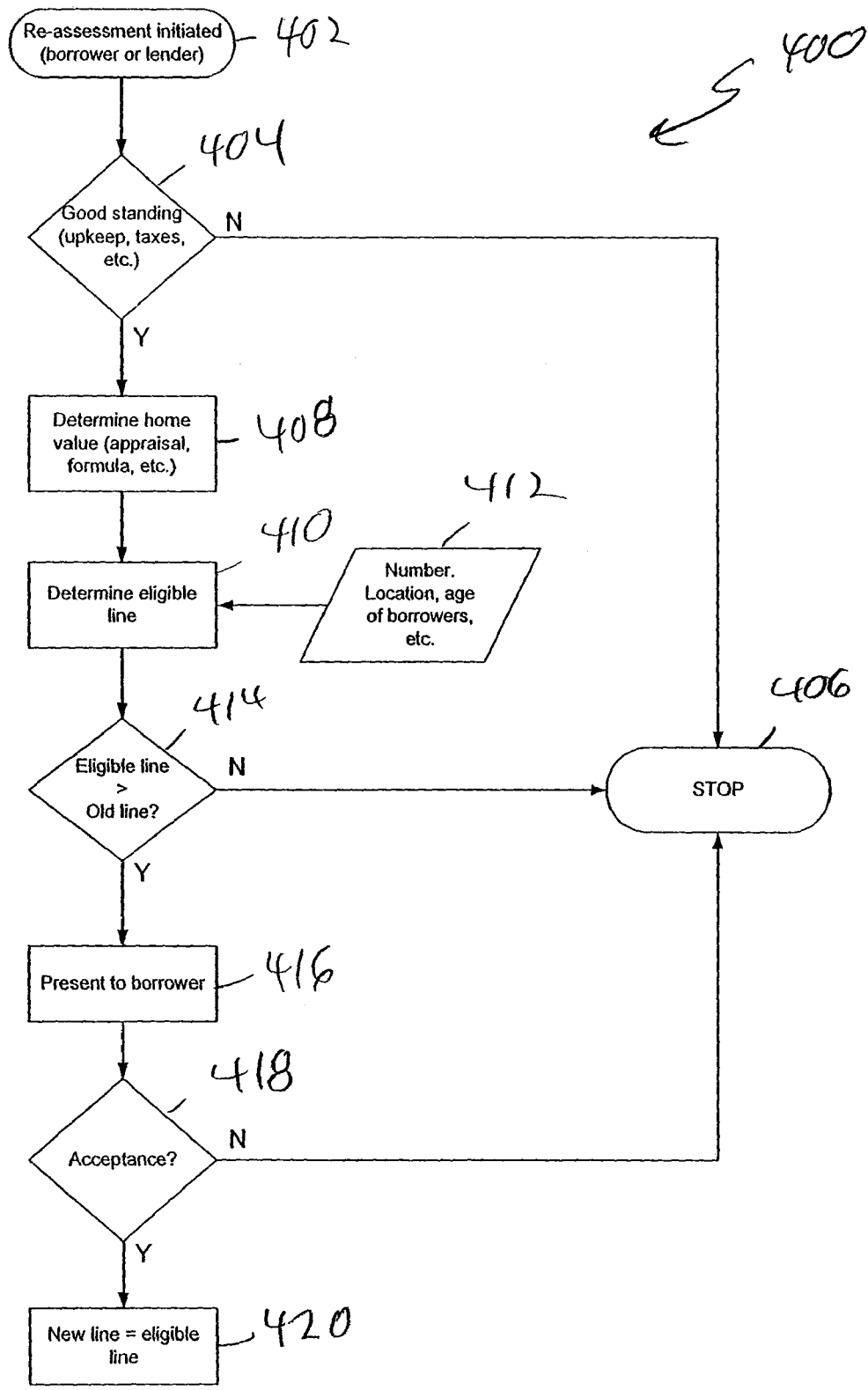

FIG. 4 illustrates a home value re-assessment process, 400, that can be used with some embodiments of the invention. The home value re-assessment feature in example embodiments can allow the borrower's line of credit to be increased periodically to reflect increases in the value of the home during the life of the loan. In some embodiments, borrowers can be offered two re-assessment options. Either the lender automatically initiates a re-assessment which recurs periodically from the date of origination (for example, every three years), or the borrower may request a re-assessment and may pay a contractually agreed re-assessment fee to the lender. In the former case, the borrower may not be required to pay any re-assessment fees. Home value can be determined through third party sources (appraisal, etc.) and the borrower can be notified. In the latter case, the lender can obtain an estimate of home value and notify the borrower. Re-assessment is initiated in FIG. 4 in either one of these two ways at block 402. Before the actual re-assessment can proceed, a determination is made at block 404 as to whether the borrower is in good-standing on the loan. If not, the process stops at block 406. Otherwise, the home value is determined at block 408. This determination could be made via an appraisal, by using a formula that estimates home value increases, or in any other fashion.

Still referring to FIG. 4, the new or "eligible" credit line based on the new assessment is determined at block 410. The re-calculation of the credit line can use the same methodology that the lender uses to calculate borrower credit lines at origination and can be based primarily on the new appraised home value and the age of the borrowers on the date of the appraisal. The number and location of the borrowers can also be taken into account, as shown by input block 412. At block 414, if the new, eligible line is found to be lower than or unchanged from the previous line, the borrower's credit line remains unchanged, and the process stops at block 406. The product can be set up so that the borrower's line will never be decreased. If the home is appraised at a value higher than the previous appraisal, the eligible credit line will be higher than the old line at block 414, and the new credit line is presented to the borrower at block 416, so that the borrower must explicitly agree to switch to the increased credit line. If the borrower accepts at block 418, the credit line is reset so that the new line equals the eligible line at block 420. Otherwise, the process stops at block 406. In a typical embodiment, if on re-assessment, the borrower disagrees with the appraised home value, the loan contract can detail a resolution process and the rights and obligations of all parties.

Figure 5:
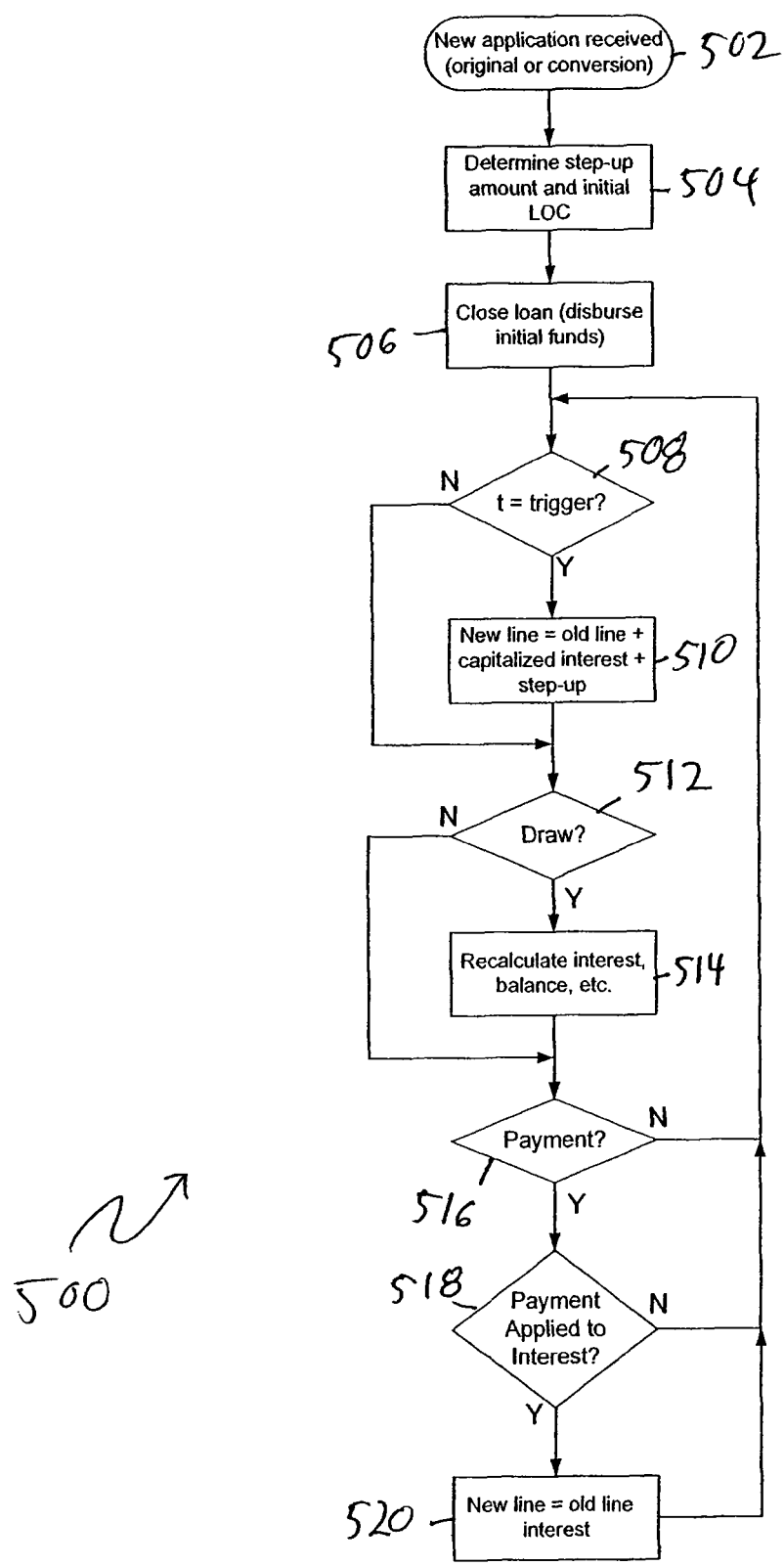

FIG. 5 illustrates another feature that can be used with embodiments of the invention in which a reverse mortgage is set up to provide a line of credit. This feature is referred to herein as a "draw limit step-up" or an "escalating draw limit"

feature. Method 500 of FIG. 5 guarantees a positive available credit limit draw amount to the borrower at each trigger interval or increment over time independent of home price appreciation, interest rates or previous line utilization. In the example of FIG. 5, a step-up amount is determined at block 502 along with the initial line of credit (LOC) after a new application is initiated at block 504. The new application can be a new reverse mortgage application, or the result of a conversion as previously described. When reverse mortgage loan is closed at block 506, the lender provides the borrower (s) with a credit line based on a schedule of the draw limit over time. The schedule specifies the maximum cumulative draw available to the borrower at any point in the loan's life. The schedule will show an increasing draw limit at every point in the schedule (which in this embodiment may be set monthly, quarterly, semi-annually or annually).

With the example step-up feature described herein, even if a customer has taken the maximum draw in a given period, the customer will always have additional funds available to draw in the following period. Different schedules may be applied to individual loans based upon loan characteristics including but not limited to borrower age at origination, borrower gender, property type, state of residence and number of borrowers on the loan.

Returning to FIG. 5, until a step-up is triggered at block 508, all draws will reduce the customer's available credit line by the amount of the draw. At a point in time at block 508, the new credit line is set at block 510 to the value of the old line, plus capitalized interest, plus the step-up amount. Regardless of whether a step-up has occurred, when the customer draws on the account at block 512, the interest and balance is calculated at block 514. The same calculation takes place if the borrower makes a payment at block 516. The customer's available credit line is calculated as the current guaranteed cumulative draw amount less the sum of all previous draws plus any principal repayments. Draws will accrue interest in the same fashion as draws from an equity release line of credit without the escalating draw limit. Additionally, whenever interest accrues at block 518, the line of credit is calculated to be the old line minus the interest at block 520.

A step-up feature like that illustrated in FIG. 5 and be set up so that the draw limit can never be decreased. The lender may also provide increases to the credit line and draw limit periodically at its own discretion. A product can be set up so that such increases will always benefit the customer by increasing both the current and future maximum cumulative draw available to the customer.

Figure 6:
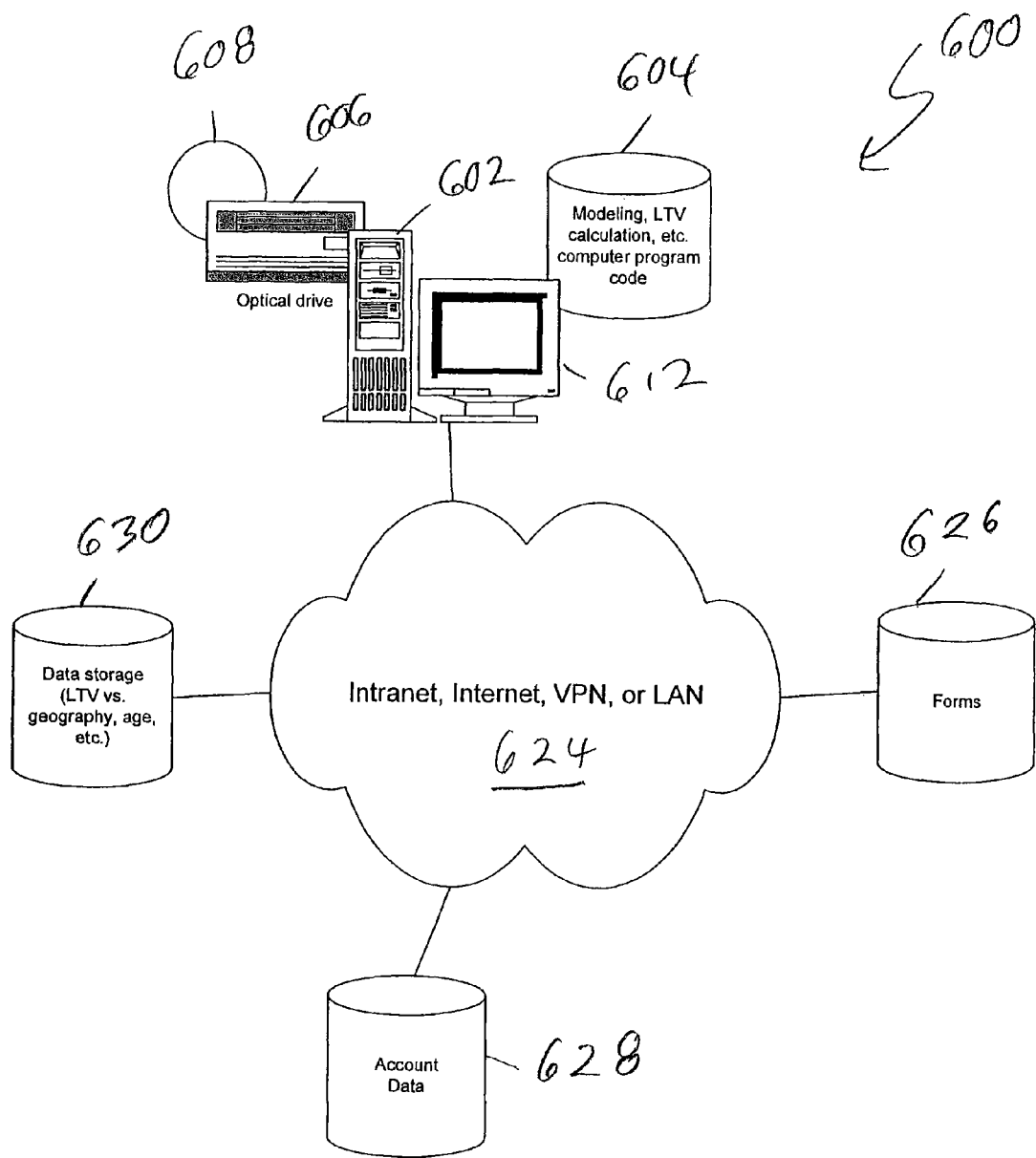
FIG. 6 is a system block diagram illustrating the operating environment of example embodiments of the present invention.

FIG. 6 illustrates a typical operating environment for embodiments of the present invention. System 600 can include a workstation or personal computer, 602 as an instruction execution or processing platform. The system includes a fixed storage medium, illustrated graphically at 604, for storing programs and/or macros that make up computer program code, which enables the modeling algorithm and any other calculations that may be used with an embodiment of the invention. In this particular example, an optical drive, 606, is connected to the computing platform for loading the appropriate computer program product into computer 602 from an optical disk, 608. Instruction execution platform 602 of FIG. 6 can execute the appropriate instructions and display appropriate screens on display device 612. These screens can include user input screens for entering various parameters, borrower information, and the like.

FIG. 6 also shows a connection to data stores, from which account data, forms, and other information can be retrieved, as needed. The connection to the data stores or appropriate databases can be formed in part by network 624, which can be an intranet, virtual private network (VPN) connection, local area network (LAN) connection, or any other type of network resources, including the Internet. Stored forms can be reside on fixed storage 626, account data can be stored in database 628, and tables regarding geography, age, gender, and the like used by the model or otherwise used to set the LTV or for any other purpose can be stored in another data store on the network for example, data store 630. The data stores shown in FIG. 6 are examples only. Any or all of the information can be stored in various places, including instruction execution platform 602.

The flowcharts and block diagrams in the figures illustrate the architecture, functionality, and operation of possible implementations of systems, methods and computer program products according to various embodiments of the present invention. In this regard, each block in the flowchart or block diagrams may represent an action or a portion of a system, which comprises one or more actions, functions, or articles for implementing the specified logical steps. These functions and/or logical steps may be implemented by people, computer program products, or a combination of the two. It should also be noted that, in some alternative implementations, the functions described herein may occur on an order different than the order presented or simultaneously. It should also be noted that functions or steps and combination of functions or steps described herein can be implemented by special purpose hardware-based systems either alone or assisted operators which perform specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer program product comprising a non-transitory computer-readable medium including computer program code for evaluating an equity release product, the computer program code further comprising:

instructions for establishing representative reverse mortgage loans, wherein each representative reverse mortgage loan provides for a sample of a reverse mortgage loan and is characterized by a borrower type and a mortality table;

instructions for determining a plurality of reverse mortgage loan scenarios, wherein each reverse mortgage loan scenario is based on an interest rate and a house price;

instructions for running each of the representative reverse mortgage loans through each of the reverse mortgage loan scenarios to measure a plurality of scenario profitability metrics for each of the reverse mortgage loan scenarios, wherein each of the scenario profitability metrics provide profitability for a corresponding reverse mortgage loan scenario;

instructions for aggregating the plurality of scenario profitability metrics across all of the reverse mortgage loan scenarios to produce aggregated profitability metrics, wherein the aggregated profitability metrics provide an aggregated profitability across all of the plurality of reverse mortgage loan scenarios; and instructions for determining a portfolio profitability across all combinations of the reverse mortgage loan scenarios and representative reverse mortgage loans based on the aggregated profitability metrics.

2. The computer program product of claim 1, wherein the instructions running each of the plurality of representative reverse mortgage loans through each of the reverse mortgage loan scenarios further comprise:

instructions for determining a home price;
instructions for determining a draw amount;
instructions for determining a rate of termination for the representative reverse mortgage loan; and
instructions for calculating a distribution for the representative reverse mortgage loan.

3. The computer program product of claim 1, wherein the computer program code further comprises instructions for establishing a value for a first loan-to-value (LTV) ratio for the reverse mortgage loan.

4. The computer program product of claim 3 wherein the instructions for establishing of the value further comprise instructions for establishing the value for each of a plurality of borrower ages.

5. The computer program product of claim 3, the computer program code further comprising:

instructions for determining a loan volume sensitivity;
instructions for establishing a second LTV ratio, wherein the second LTV ratio maximizes profit on average across all of the plurality of reverse mortgage loan scenarios; and
instructions for setting the first LTV ratio for the equity release product to be the lesser of the second LTV ratio and the value.

6. The computer program product of claim 5, wherein the computer program code further comprises instructions for adjusting the first LTV ratio for the equity release product based on a geographic market.

7. The computer program product of claim 4, the computer program code further comprising:

instructions for determining a loan volume sensitivity;
instructions for establishing a second LTV ratio, wherein the second LTV ratio maximizes profit on average across all of the plurality of reverse mortgage loan scenarios; and
instructions for setting the first LTV ratio for the equity release product to be the lesser of the second LTV ratio and the value.

8. The computer program product of claim 7, wherein the computer program code further comprises instructions for adjusting the first LTV ratio for the equity release product based on a geographic market.

9. The computer program product of claim 4, the instructions for running each of the plurality of representative reverse mortgage loans through each of the reverse mortgage loan scenarios further comprising:

instructions for determining a home price;
instructions for determining a draw amount;
instructions for determining a rate of termination for the representative reverse mortgage loan; and
instructions for calculating a distribution for the representative reverse mortgage loan.

10. The computer program product of claim 5, the instructions for running each of the plurality of representative reverse mortgage loans through each of the reverse mortgage loan scenarios further comprising:

instructions for determining a home price;
instructions for determining a draw amount;
instructions for determining a rate of termination for the representative reverse mortgage loan; and
instructions for calculating a distribution for the representative reverse mortgage loan.

* * * * *